United States Patent Office 3,327,841
Patented June 27, 1967

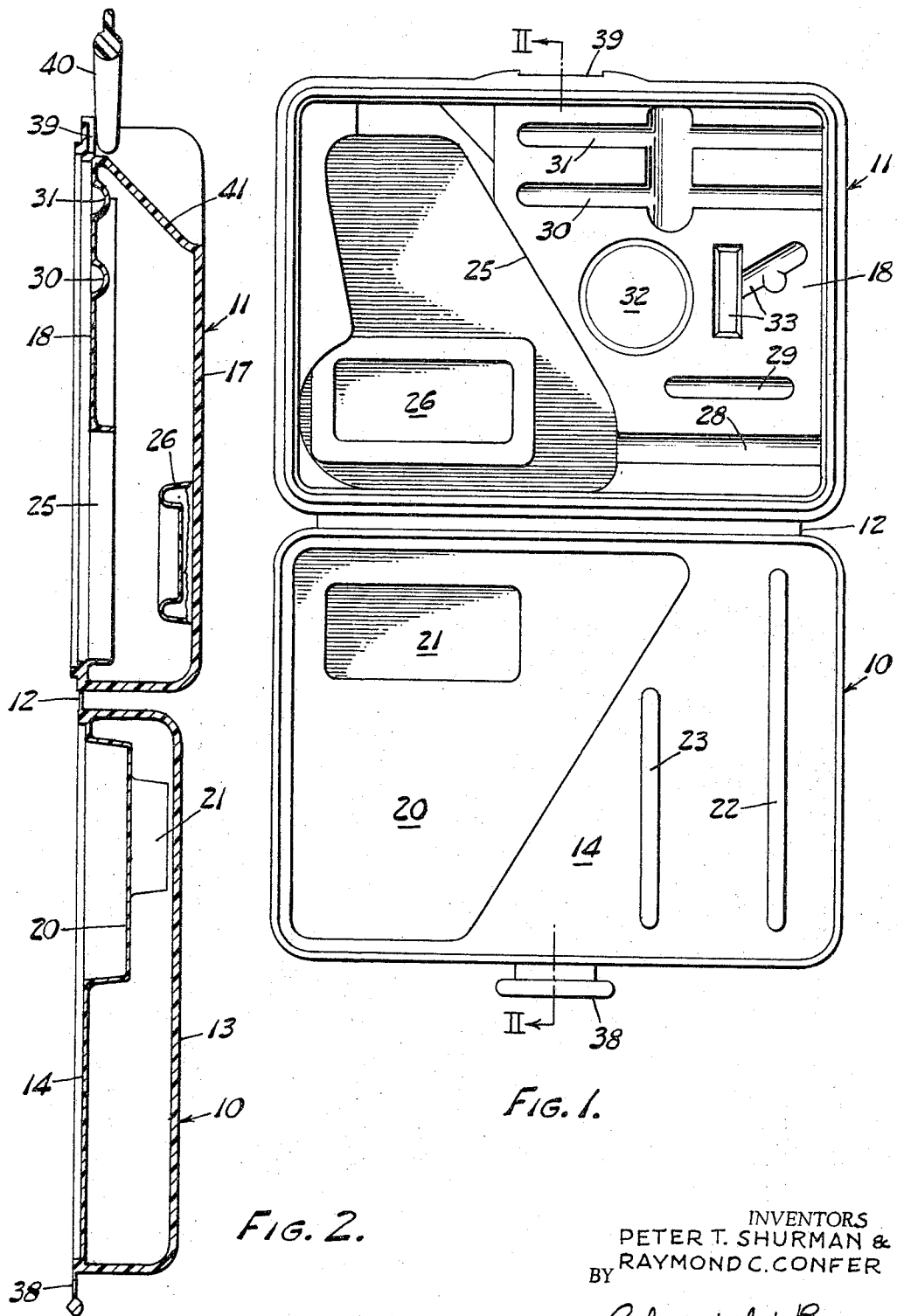

3,327,841
PLASTIC CONTAINER
Peter T. Schurman, Snyder, and Raymond C. Confer, Gasport, N.Y., assignors, by mesne assignments, to W. R. Grace & Co., New York, N.Y., a corporation of Connecticut
Filed Sept. 9, 1964, Ser. No. 395,234
3 Claims. (Cl. 206—1)

This invention relates to receptacles of molded thermoplastic material comprising hinged complementary portions wherein the complementary portions and the hinge structure may comprise a single unitary molded structure and, more particularly, wherein at least one of the complementary portions comprises an integral double-wall structure including a relatively rigid outer casing wall portion and a thinner and/or more flexible inner wall portion.

The receptacle of the present invention is of the general type disclosed in our copending patent application, Ser. No. 369,159, filed May 21, 1964, wherein each of the two hinged parts of the receptacle is blow-molded to form a double-walled enevelope. One side of each of the envelopes thus formed comprises the exterior wall of one side of the receptacle while the other side of each envelope forms an interior wall which may be cut away, in whole or in part, depending on the type of receptacle and the use to which it is to be put.

As in the receptacle of our prior application, plastic material is extruded in tubular form. This tubular extrusion is preferably of oblong cross section and complementary mold parts are closed against the relatively flat surfaces of the extruded tube. One mold part has a pair of adjacent cavities which form the exteriors of the two parts of the receptacle and the other mold part is shaped to form the exposed surfaces of the interior walls of the receptacle parts. When the mold parts close they pinch the extrusion walls about the aforesaid cavities to form the meeting edges of the two receptacle parts and a unitary hinge may be molded by complementary mold parts which extend between the two cavities.

This pinching and forming forms two joined envelopes which are then inflated to assume the configurations of the mold cavities of one mold part and the exposed surfaces of the inner walls of the receptacle parts which are formed at the other mold part. In manufacturing the receptacle of the present invention the aforesaid oblong extrusion is formed so that one of its flat wall surfaces is substantially thinner than the other whereby, after blowing, the exterior walls of the receptacle are substantially thicker and more rigid than the interior walls.

In the form of the present invention shown herein by way of example, a portion of one of the interior walls is cut away, leaving the remainder to form a permanently covered compartment, in a manner and for purposes which will be explained more fully later herein.

A further feature of the present invention resides in the provision of an inwardly depressed formation in an exterior wall of one part of the receptacle which provides a pad or platform at the interior thereof which supports one side of an object in the receptacle, the other side of such object being held resiliently against the pad or platform by the relatively flexible interior wall of the other part of the receptacle.

In the preferred form shown and described herein the receptacle parts are simultaneously molded and are joined by an integral flexible plastic hinge which is formed during the molding operation. However, it is to be understood, that, in a broader aspect of the invention, the two receptable parts may be formed as separate members and connected by other hinge means or by other connecting members.

While a single specific embodiment of the principles of the present invention is illustrated in the accompanying drawing and described in detail in the following specification, it is to be understood that such embodiment is by way of example only and that various mechanical modifications may be made without departing from the spirit of the invention, the scope of which is limited only as defined in the appended claims.

In the drawing:
FIG. 1 is a top plan view of one form of the receptacle of the present invention in open condition showing the interior surfaces thereof; and
FIG. 2 is a cross sectional view on the line II—II of FIG. 1.

Referring particularly to FIGS. 1 and 2 of the drawing, the form of container shown herein by way of example comprises a pair of box-like complementary body members designated generally 10 and 11 which are molded integrally to include a relatively thin connecting hinge portion 12. The body member 10, as will be noted particularly from FIG. 2, comprises a blown hollow structure which includes an outer wall portion 13 of such thickness as to be relatively rigid and an inner wall 14 which is substantially thinner than outer wall portion 13 and is accordingly somewhat flexible.

The body member 11 likewise includes a relatively rigid outer wall portion 17 and a relatively thinner inner wall 18 which is more flexible than the outer wall. Body member 11 is likewise blow molded but in this instance portions of the inner wall 18 are cut away in a manner and for purposes which will presently appear.

While it is to be understood that containers or receptacles constructed according to the present invention may be designed to receive a wide variety of articles, either as a custom built container to receive a given piece of equipment or specific articles or as a general carry-all receptable, the principles are aptly illustrated herein in connection with a case for an electrical soldering gun and certain accessories therefor.

It will be noted that inner wall 14 of body member 10 lies substantially at the meeting plane of the body members but includes a major depressed portion 20 to provide an article-receiving recess and a further depression 21 is formed in depressed portion 20. The inner wall 14 further includes a pair of raised bead or rail formations 22 and 23.

Referring to the other body member 11, inner wall 18 thereof has a cutout portion 25 corresponding roughly in outline with the depressed portion 20 and has a raised pad 26 in the rigid wall 17 thereof which registers generally with depression 21 when the receptacle is closed and is formed by depressing rigid wall 17 inwardly.

The remainder of inner wall 18, that is, the portion which is not cut away to form the opening 25, forms a shelf connected at three sides to the rigid portion 17 of body member 11.

The shelf portion of inner wall 18 is formed with elongate recesses of semi-circular cross section as at 28, 29, 30 and 31, a circular recess or depression 32 and an angular recess 33. The handle portion of a conventional soldering gun lies in the cutout 25 of wall 18 with its barrel lying in recess 28 and with one of its side walls lying against pad 26. When the receptacle is closed the depressed portion 20 of the other inner wall 14 engages against the other side of the handle portion of the gun and the proportions are such that the handle of the gun is closely confined and securely held between pad 26 and the depressed portion 20 of inner wall 14.

The relative flexibility of wall 14 permits the latter to yield resiliently upon engagement of depressed portion 20 against the gun handle. The pad 26, being offset from outer wall 17, may likewise contribute to the yieldable gripping of the handle of the gun between depressed portion 20 and pad 26. Prior to placing the solder gun handle in the opening or cutout 25 the electrical cord thereof is pushed beneath the shelf formed by inner wall 18.

The usual soldering gun barrel which holds the soldering tip at its outer end lies in recess 28 when the gun handle is placed as described above. Other sizes or types of barrels or tips are received in recesses 29, 30, 31 and 33 and recess 32 is provided to receive a coil of solder wire.

When the body member 10 is closed over the body member 11 as aforesaid the bead or rail formation 22 engages across and against the barrel of the soldering gun in recess 28 and against the accessories in recesses 29, 30, 31 and 33. The formation 23 engages across the barrels and tips in recesses 30 and 31 and overlies recess 32.

Since both the recess and the bead or rail formations are formed in the relatively flexible inner wall portions 18 and 14, respectively, the grooves and beads are proportioned to cause slight flexure of walls 14 and 18 whereby the parts are held securely between such walls and the walls exert a resilient pressing engagement against the contained parts.

The present container may have a latch means like that shown and described in detail in our copending application Ser. No. 369,159. In the present drawing the tab portion of the fastener is designated 38 and the complementary tab receiving notch formation of body member 11 is designated 39. The handle member 40 may likewise be like that described in our above-identified copending application. Facing wall surfaces for receiving the handle member 40 are formed by a recess formation 41 in outer wall 17 of body member 11.

We claim:
1. A unitary one-piece thermoplastic hinged receptacle comprising

(a) a pair of complementary box-like members joined along corresponding edges by hinge means,
(b) said members and hinge comprising a unitary one-piece construction,
(c) each of said members being of hollow double wall construction comprising a relatively rigid outer wall spaced apart from a relatively thin flexible inner wall,
(d) at least one of the inner walls having an opening therein providing access to the space between the walls, and
(e) a portion of the inner wall of one of said members is cut away to receive an article, the inner wall of the other said members being adapted to bear resiliently against said article to retain said article in said cut-away portion.

2. The receptacle of claim 1 wherein the outer wall has a raised pad inwardly offset from the main body thereof and adjacent said opening whereby upon closure of said receptacle an article disposed therein is held between said raised pad and the inner wall of the other member.

3. The receptacle of claim 2 wherein said raised pad comprises a contoured surface on said outer wall.

References Cited

UNITED STATES PATENTS

| | | | |
|---|---|---|---|
| 827,124 | 7/1906 | Speer | 220—72 |
| 2,515,113 | 7/1950 | Chaplin | 92—54 |
| 2,687,157 | 8/1954 | Cowan | 150—.5 |
| 2,779,578 | 1/1957 | Corey | 263—5 |
| 2,790,547 | 4/1957 | Sutton | 206—72 |
| 3,025,947 | 3/1962 | Hammer | 206—4 |
| 3,095,086 | 6/1963 | Berg | 206—45.19 |
| 3,163,287 | 12/1964 | Barnett | 206—72 XR |
| 3,192,978 | 7/1965 | Horvath | 206—46 XR |

FRANKLIN T. GARRETT, *Primary Examiner.*